US005549073A

United States Patent [19]
Askins et al.

[11] Patent Number: 5,549,073
[45] Date of Patent: Aug. 27, 1996

[54] COLLAPSIBLE CAGE

[75] Inventors: William E. Askins; Michael W. Stewart; Gary Roulston, all of Lititz; Joseph F. Fiore, Jr., Lebanon, all of Pa.

[73] Assignee: Woodstream Corporation, Lititz, Pa.

[21] Appl. No.: 459,497

[22] Filed: Jun. 2, 1995

[51] Int. Cl.⁶ .............................. A01K 1/03; A01K 31/08
[52] U.S. Cl. ............................................ 119/474; 119/461
[58] Field of Search .................................... 119/17, 18, 19

[56] References Cited

U.S. PATENT DOCUMENTS

| | | | |
|---|---|---|---|
| 1,965,259 | 8/1957 | Johnson . | |
| 3,913,258 | 10/1975 | Souza et al. | 43/60 |
| 4,484,540 | 11/1984 | Yamamoto | 119/19 |
| 4,527,512 | 7/1985 | Sugiura | 119/19 |
| 4,696,257 | 9/1987 | Neary et al. | 119/166 |
| 4,762,085 | 8/1988 | Ondrasik | 119/17 |
| 5,010,848 | 4/1991 | Rankin | 119/26 |

FOREIGN PATENT DOCUMENTS 26649 7/1914 United Kingdom ...................... 119/19

OTHER PUBLICATIONS

Star Large Collapsible Plastic Crate (The General Corporation)—advertisement appearing in Jun. 1995 issue of the Pet Dealer Magazine.

Midwest Homes For Pets Catalogue –Publication date unknown.

*Primary Examiner*—Robert P. Swiatek
*Assistant Examiner*—Yvonne R. Abbott
*Attorney, Agent, or Firm*—Jacobson, Price, Holman & Stern, PLLC

[57] ABSTRACT

A collapsible cage for dogs or rabbits has a rectangular base, fold-down end walls folding side walls and a roof. The walls and roof are made of metal grids. The end walls fold down onto the base one over the other. The side walls fold in the middle concertina-wise and are hinged at the top to opposite edges of the roof allowing the side walls and roof to collapse onto the base over the end walls. The base has a pull-out tray or pan and an access door is provided in one of the end walls. Releasable clips are provided to hold the walls and roof together in an elevated position of the structure.

21 Claims, 8 Drawing Sheets

COLLAPSIBLE CAGE

BACKGROUND OF THE INVENTION

This invention relates to cage structures particularly for pet animals such as dogs or rabbits.

Dog crates, for example, are recommended by many owners, trainers, veterinarians and breeders as a means for training puppies and to provide a safe, secure environment for housebreaking, travel and general control. In time, the crate becomes the dog's den, which he regards as his home, rather than a cage which confines him.

Cage structures according to the invention may also be used as rabbit hutches, for example, are further useful for transportation of pet animals, and can also be used in certain kinds of animal traps.

SUMMARY OF THE INVENTION

It is an object of the invention to provide a collapsible cage structure which can be transported in a collapsed state and which can be rapidly and easily erected by a user into a sturdy animal-retaining cage without the use of specialized tools or other equipment.

Another object of the invention is to provide a collapsible cage structure having a rectangular base, peripheral walls and a roof, wherein the walls and roof can be compactly folded against the base, so that the structure, when folded, is contained wholly within the footprint of the base.

Still another object of the invention is to provide a collapsible cage structure as above, which includes a sliding removable pan in the base for animal droppings and the like.

Yet another object of the invention is to provide a collapsible cage structure as above, in which at least the peripheral walls and roof are formed from metal grids.

In fulfillment of the above and other objects, the invention provides a collapsible cage structure comprising a rectangular base, end walls, side walls and a roof wherein the end walls, side walls and roof are formed from rectangular metal grids the end walls being hinged along their bottom edges to opposite ends of the base for folding down of the end walls onto the base one over the other and for unfolding from the base into an elevated postion, the side walls each comprising upper and lower grids interconnected by a hinge joint, the lower grids being hinged along their bottom edges to opposite side edges of the base, the upper grids being hinged along their top edges to side edges of the roof, the side walls thus being foldable inwardly concertina-wise about the hinge joints to collapse the side walls and roof onto the base over the end walls and being unfoldable outwardly about the hinge joints to elevate the side walls and roof prior to elevating the end walls, clips for releasably securing the end walls, side walls and roof in the elevated position and an animal access opening at least in one of the end or side walls. Preferably, the hinge joints of the side walls may include a stop mechanism for preventing the side walls from unfolding outwardly beyond the vertical. The stop mechanism may conveniently comprise a section of one of the upper or lower grids extending beyond the hinge joint.

The base of the cage many also be formed of metal grid-work with a slide-in, slide-out tray or pan in metal or plastic.

In one embodiment of the invention the collapsible cage is designed particularly as a dog home and in a second embodiment of the invention the collapsible cage is made in lighter gauge gridwork and is designed particularly as a rabbit hutch. In the hutch structure, the base is provided with an upper fixed grid over the removable tray.

The invention provides a collapsible cage structure which is compact to pack and transport in its collapsed state, which is simply and readily opened out and fixed in upright position, for use in which a sturdy cage structure is provided and which is equally easily collapsed and stored.

Additional features and advantages of the invention will become apparent from the ensuing description and claims read in conjunction with the attached drawings.

DETAILED DESCRIPTION OF THE PREFERRED EMBODIMENTS

Figure 1:
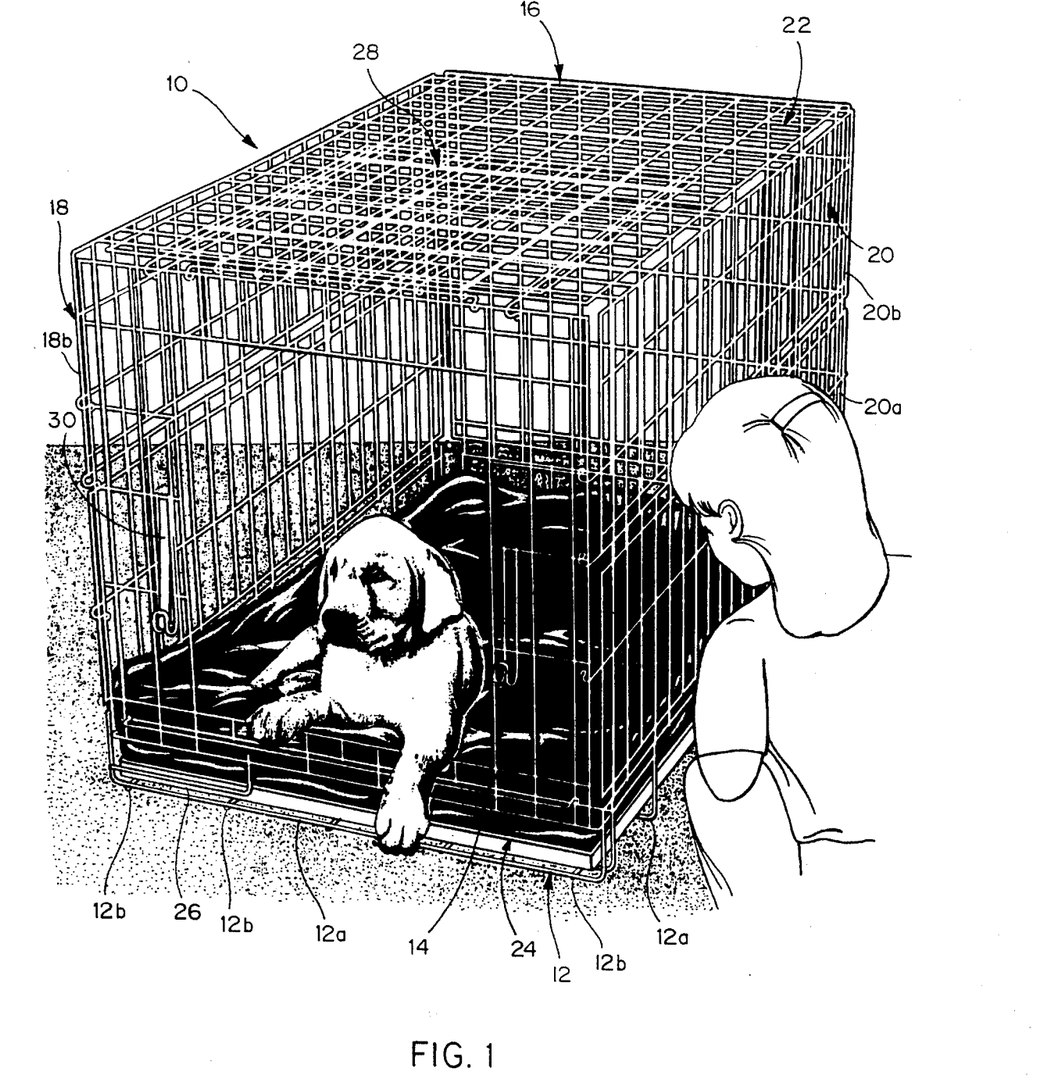
FIG. 1 is a perspective in-use view of a collapsible dog home according to the invention.
Figure 2:
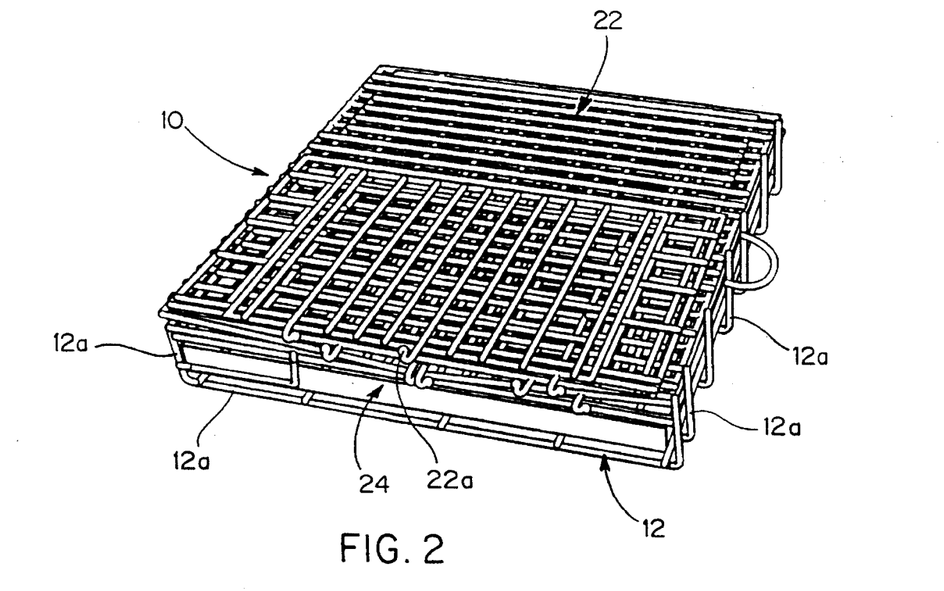
FIG. 2 is a perspective view of the dog home in a collapsed condition for storage, packing and transportation.
Figure 3:
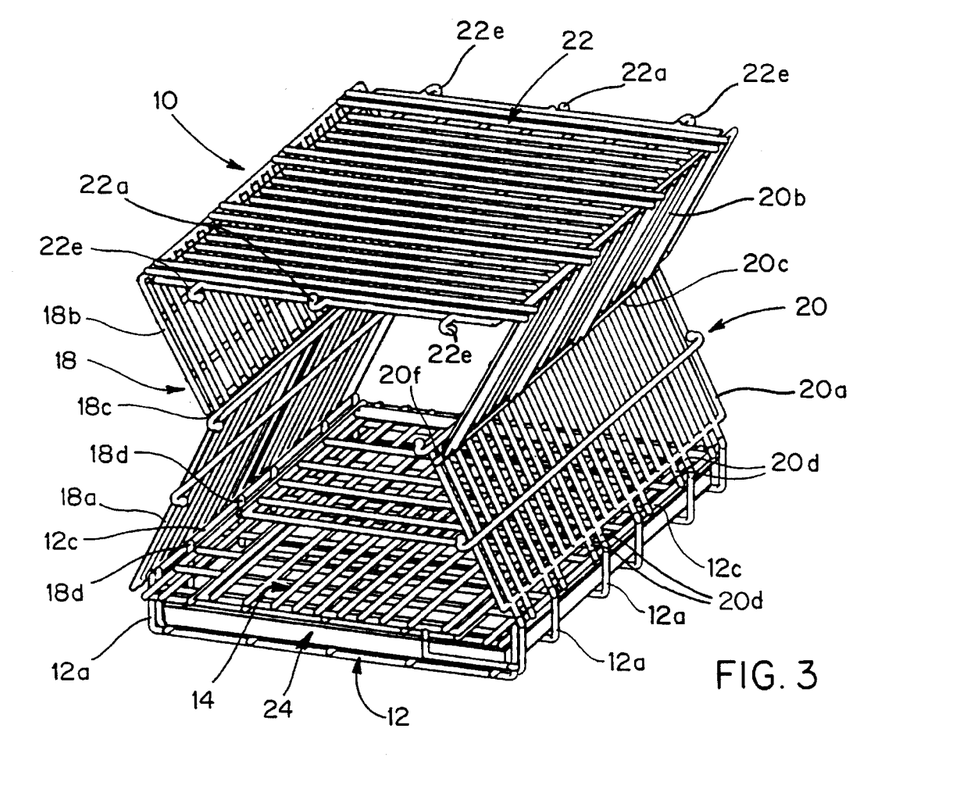
FIG. 3 is a perspective view of the dog home showing a first step in erecting the home from the collapsed position.

FIGS. 1–7 show a collapsible and portable dog home 10 in the form of a cage structure formed of plural metal grid-like sections interconnected in a manner to be described in more detail below. FIG. 2 shows the dog home in a collapsed position for storage or transportation, FIG. 3 shows the dog home in a partially elevated position and the remaining figures show the dog home in a fully elevated in-use position.

In more detail, the dog home comprises a base 12, end walls 14, 16 hinged along their bottom edges to respective end edges of the base, so that the end walls can be folded down onto the base, one over the other, as best seen in FIG. 3, folding side walls 18, 20 each comprising a lower grid 18a, 20a and an upper grid 18b, 20b connected to the respective lower grid by a hinge joint 18c, 20c and a roof 22 hinged at its side edges to upper edges of the respective upper grids 18b, 20b. The lower edges of the respective lower grids 18a, 20a are hinged to respective side edges of the base 12. The arrangement is such that the side walls 18, 20 can fold inwardly concertina-wise about the hinge joints 18c, 20c in order to collapse the side walls and roof onto the base on top of the downwardly folded end walls and form the compact package shown in FIG. 2.

In more detail still, the base 12 comprises a generally rectangularly shaped metal grid having transverse metal rods 12a and longitudinal metal rods 12b. The ends of rods 12a are bent upwardly as are the ends of rods 12b at one end only (the back) of the dog home. The base 12 is thus formed into a dish-like structure with an open front where there are no upwardly turned ends to the rods 12b. A metal or like tray or pan 24 is provided to slide into and out of base 12 from the open front and a hinged wire locking hook 26 attached to the base is provided for holding the tray in place. Release and swinging away of the hook allows the tray to be removed.

The upper ends of rods 12a are welded to longitudinal rods 12c at the side edges of the base and grids 18a, 20a have vertical rods 18d, 20d with their lower ends curled around rods 12c to form hinges between the lower grids and the base. Similar connections are made between grids 18a, 18b and 20a, 20b to form the hinge joints 18c, 20c and again between the upper edges of grids 18b, 20b and the side edges of the roof form hinges between the side walls and the roof. In the case of the connections between grids 18a, 18b and 20a, 20b, the end most rod of one grid is hinged to a rod adjacent the end most rod of the adjacent grid to provide a grid section such as section 20f seen in FIG. 3 which extends beyond hinge joint 20c. This has the effect of providing a stop allowing the side walls to hinge inwardly only and the walls cannot kink outwardly beyond the vertical position, i.e., a planar configuration of the respective side wall.

End wall 14 at the front of the cage is hinged to the base at its lower end above the level of pan 24 For example, the base may have a fixed rod extending across the cage at the front above the pan and vertical rods of end wall 14 may have their ends curled around rod to form a hinge. A similar hinge connection is formed between the base and end wall 16 at the back end of the cage. The hinge connections between the end walls and the base may be somewhat displaced vertically so that one end wall can fold down onto the base over the other end wall. The hinge connections between side walls 18, 20 and the base are at a still higher level so that the side walls and the roof can fold down onto the base over the end walls.

Figure 4:
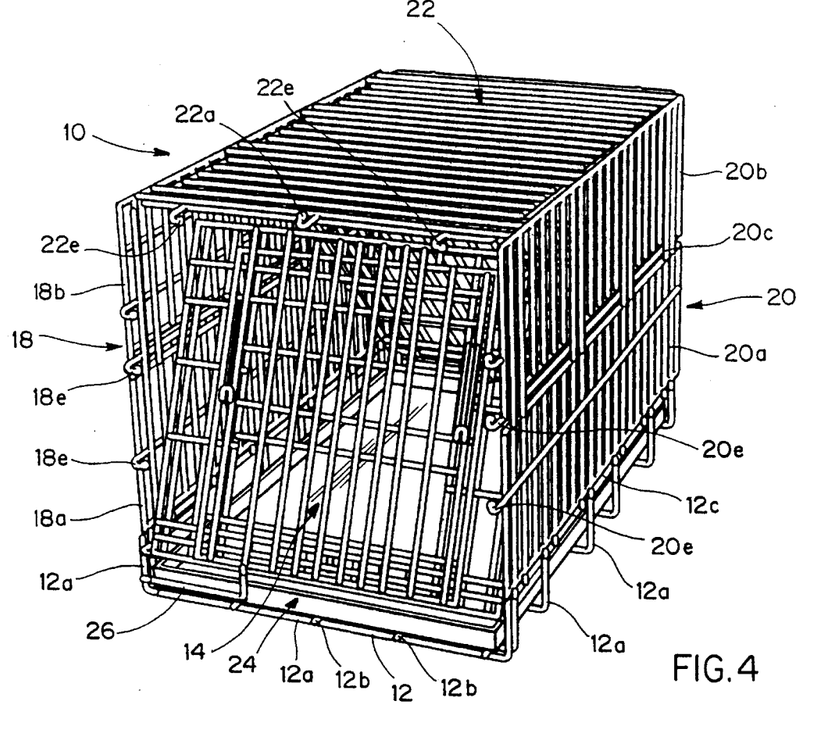
FIG. 4 is a perspective view of the dog home showing a second step in erecting the home.
Figure 5:
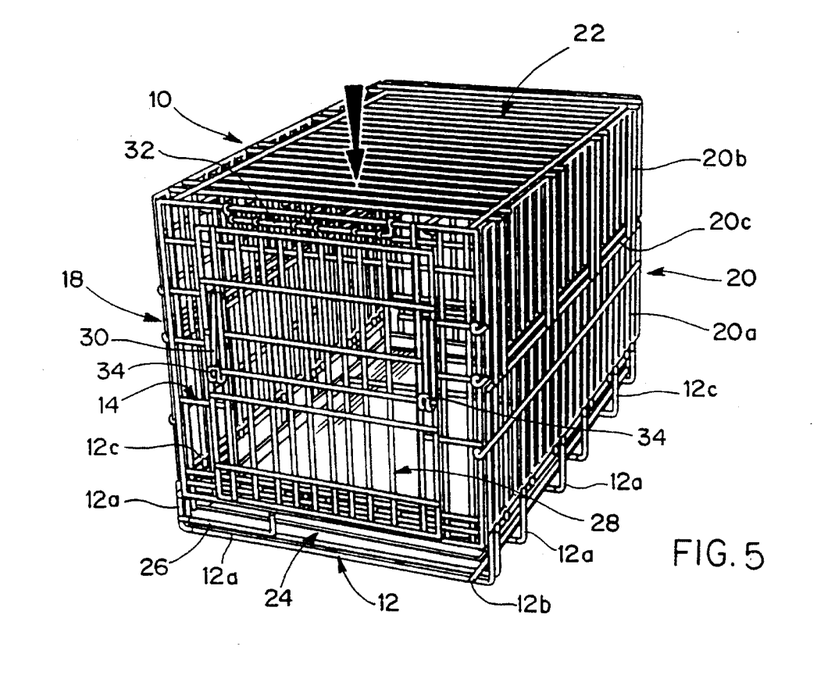
FIG. 5 is a perspective view of the dog home when erected showing an animal access door in closed position.
Figure 6:
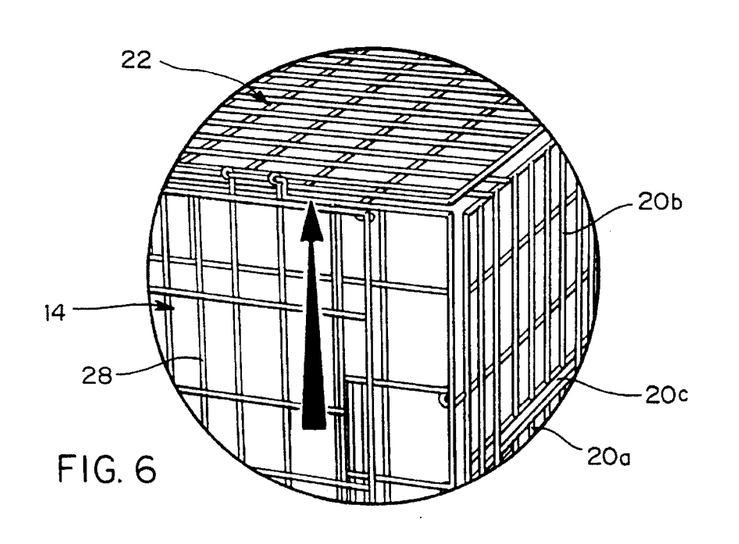
FIG. 6 is an enlarged view showing the details of one corner of the dog home as seen in FIG. 5.
Figure 7:
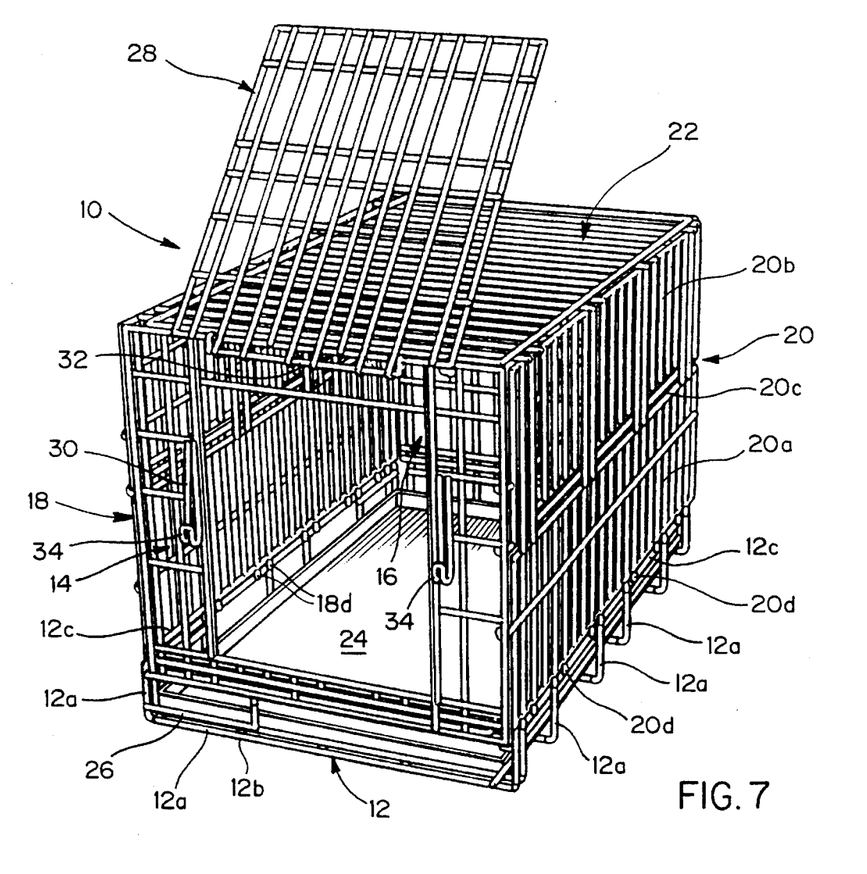
FIG. 7 is a view similar to FIG. 5 showing the door in an open position.
Figure 8:
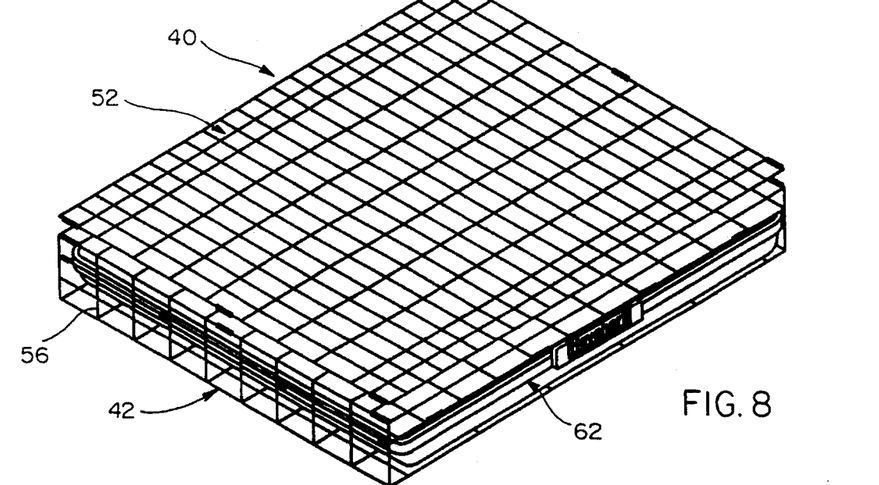
FIG. 8 is a perspective view of a collapsible rabbit hutch according to the invention shown in a collapsed condition.

In order to elevate the structure from the position shown in FIG. 2, the roof is lifted until the side walls 18, 20 are fully extended. Then, holding the roof in the elevated position, the end walls 14, 16 are swung to upright position as shown in FIGS. 4 and 5. Hooks 18e, 20e (FIG. 4) are provided at the ends of selected longitudinal rods of the side walls and the vertical end rods of the end walls fit into the hooks in the elevated position similar hooks 22e are formed at opposite ends of the roof and the top most rods of the end walls fit into these hooks. To latch the cage in the elevated position the roof may have a central lengthwise rod terminating in upwardly facing hooks 22a at the front and back ends which can be pushed down when the walls are opened out to snap under the top-most rods 14a, 16a of the end walls. To collapse the structure, these steps are simply reversed.

The front wall 14 incorporates an upwardly sliding and outwardly pivoting door 28 which can be latched closed flat against wall 14 by means of a push-in spring lever latch 30 mounted on wall 14. To open the door, latch 30 is pressed inwardly allowing door 28 to slide upwardly somewhat and then pivot out and up to lie flat on the roof 22. To this end, the door is mounted on a double hinge arrangement comprising a U-shaped rod 32 hinged to the top-most rod of wall 14 and vertical rods of the door and hinged to rod 32, see FIGS. 5 and 7. For latching the door closed, a horizontal rod of the door fits into hooks 34 provided on wall 14 and latch 30 snaps over rod 28b.

FIGS. 8–14 show a second embodiment collapsible cage structure 40 according to the invention particularly suitable for use as a rabbit hutch and which is made form lighter gauge metal grids than the dog home previously described.

Figure 9:
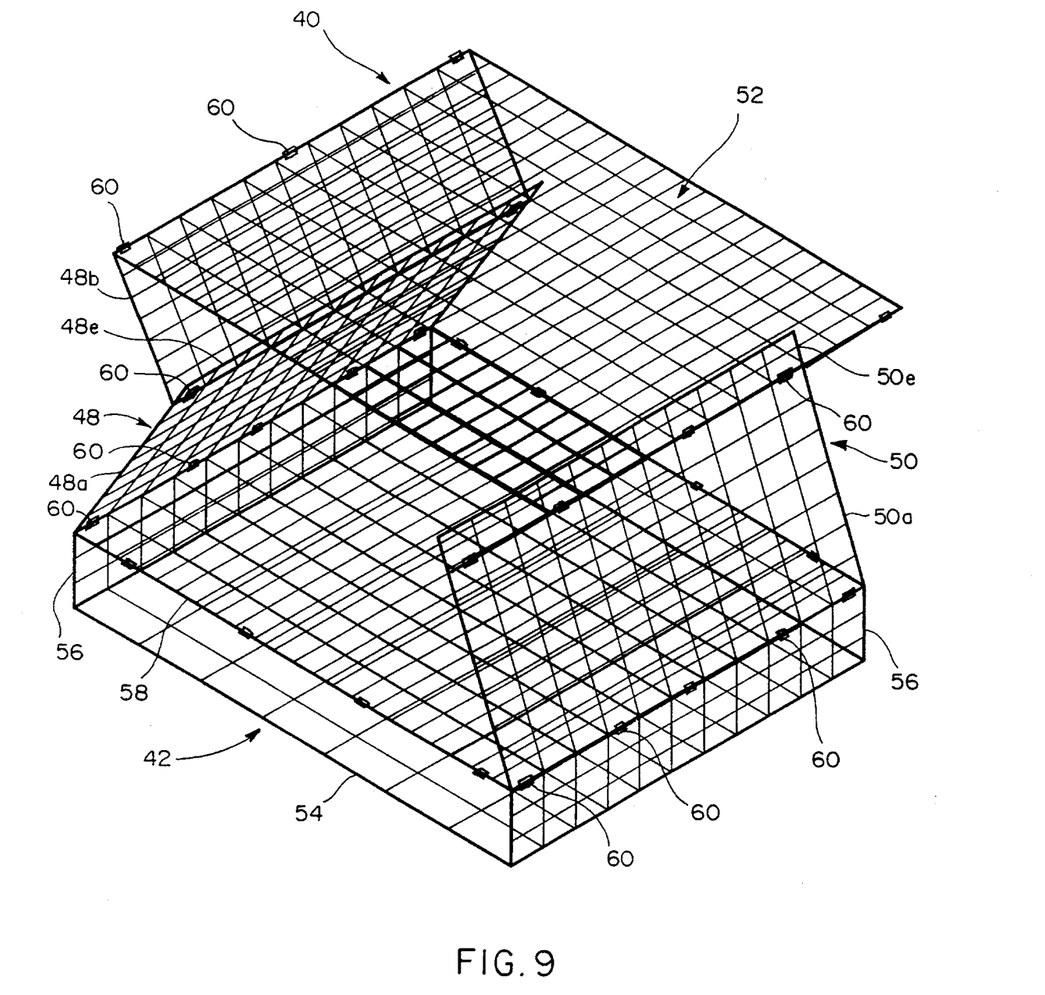
FIG. 9 is a perspective view of the rabbit hutch in a partly erected condition.

Cage structure 40 again comprises a rectangular base 42, end walls 44, 46 hinged to the base for folding down onto the base one over the other, concertina-type side walls 48, 50 and a roof 52 hingedly attached at its side edges to the upper edges of side walls 48, 50. The structure thus collapses and extends in like manner to the previous embodiment. In FIG. 9 the end walls 44, 46 have been omitted for clarity.

In the second embodiment, base 42 comprises a lower grid 54 with upwardly turned sides 56 and an upper grid 58 attached to the lower grid by metal connector sleeves 60 gripping the endmost rods of the respective grids. A plastic slide-out droppings tray or pan 62 is provided between the grids. The end walls 44, 46 are similarly connected to the upper grid 58 by additional sleeves 60, the respective sleeves being dimensioned or providing sufficient play to allow one of the end walls to fold down on top of the other.

Side walls 48, 50 again comprise upper and lower grids 48a, 50a, and 48, 50b hingedly interconnected by further sleeves 60 to allow for the concertina effect. Again, one grid on each side wall (in this case the lower grids 48a, 50a) have sections (48e, 50e) extending beyond the central hinge joint between the grids, to form stops which prevent the side walls from unfolding outwardly beyond the vertical. The lower panels are connected to grid 58 by still further sleeves 60 that provide sufficient elevational clearance for the side walls to fold down onto the folded-in end walls 44, 46. The cage structure opens out and folds in like manner to the previously described dog house.

Figure 10:
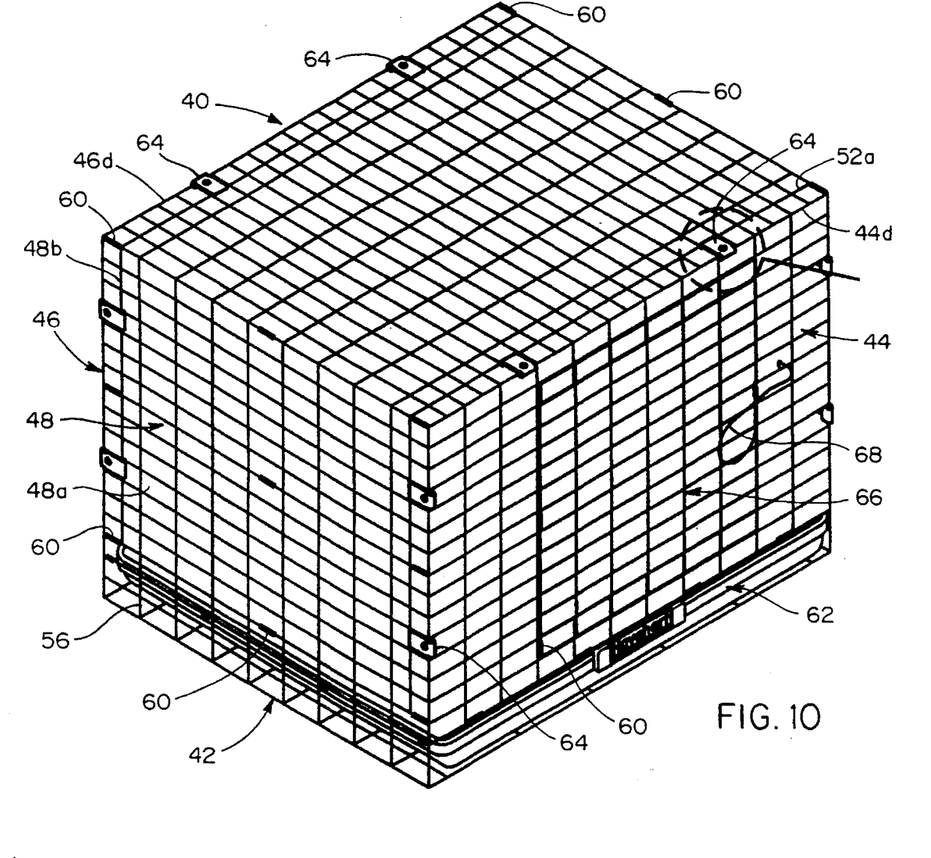
FIG. 10 is a perspective view of the rabbit hutch in an erected condition.
Figure 10A:
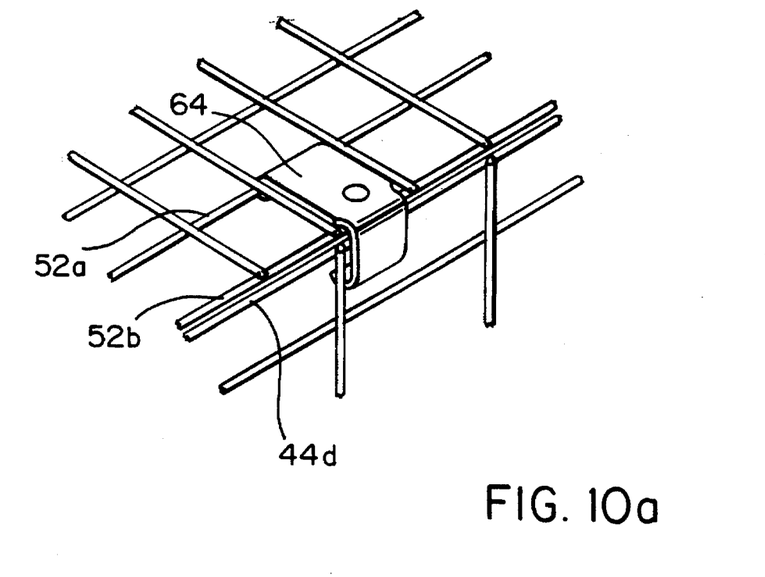
FIGS. 10a and 10b are enlarged perspective views of parts of the rabbit hutch showing fold-over clips for latching the walls and roof of the hutch together in the erected condition.
Figure 10B:
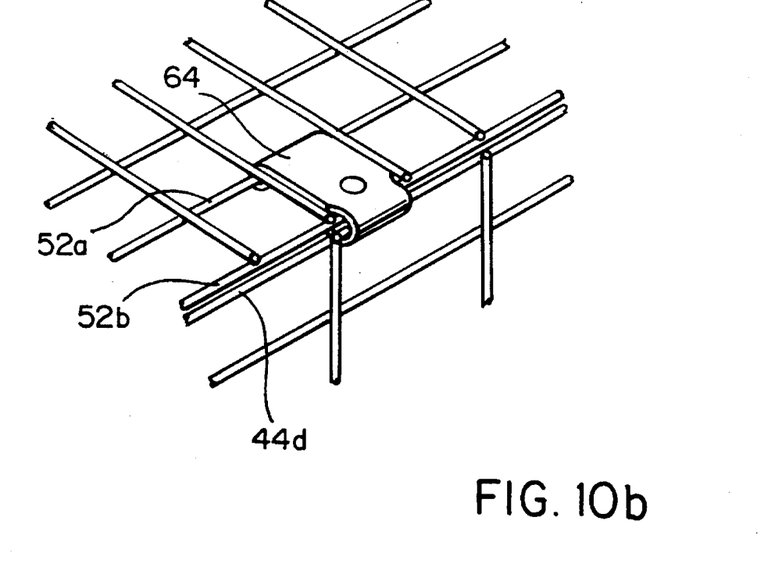

In order to releasably latch the cage structure in the upright elevated position pivotal bend-over light gauge metal clips 64 are provided at the junctions of the end walls and roof. As best seen in FIGS. 10a and 10b each clip 64 comprises a lightweight metal plate curled at one end around a rod such as rod 52a adjacent end rod 52b of the roof to allow for pivoting of the clip. The clip extends over the end rod 52b and the adjacent top rod 44d or 46d of a respective end wall and can be manually squeezed around to grip rods 52b and 44d or 46d together. Additional clips 64 are similarly mounted to grip the edges of the side walls and end walls together. When the cage structure is to be collapsed the clips can be opened out by hand. The clips 64 can also be used to hold the walls, roof and base together in the collapsed condition of the structure.

End wall 44 at the front of the cage structure incorporates a pivoting door 66 attached by further sleeves 60 and having a spring wire retention latch 68.

Figure 11:
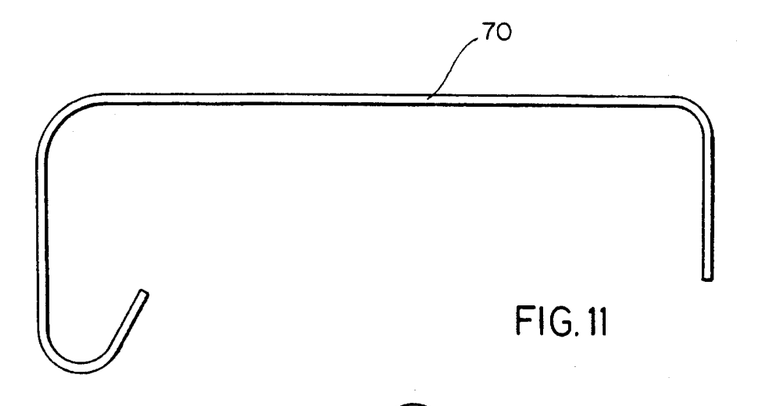
FIGS. 11–14 are elevational views of alternative clips which can be used for holding the walls and roof of the hutch together.
Figure 12:
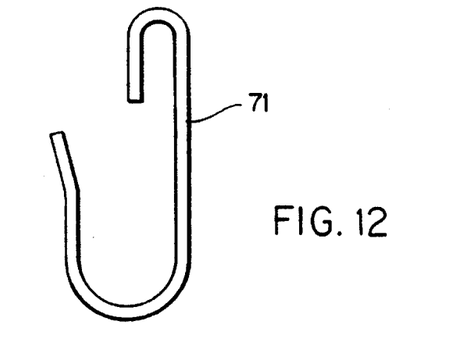
Figure 13:
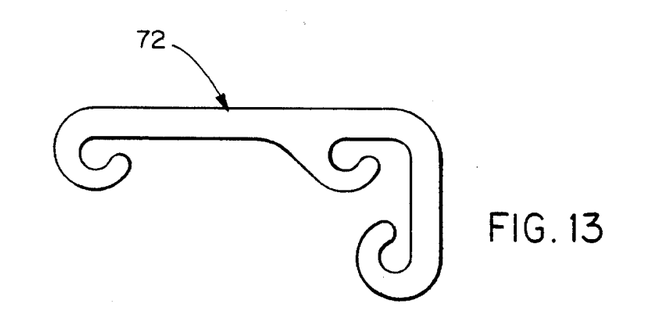
Figure 14:
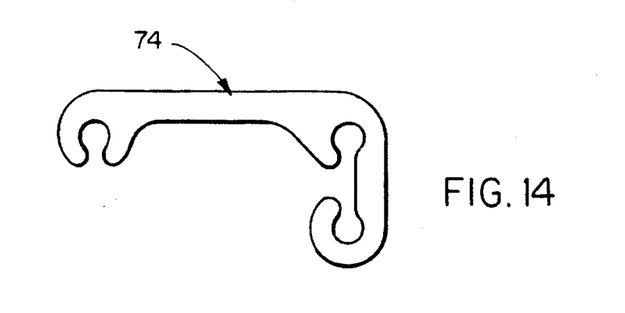

FIGS. 11 and 12 show alternative forms of metal clips 70, 71 which can be used in place of the clips 64 and FIGS. 13 and 14 show alternative snap on and snap over pivotal plastic clips 72, 74 which can be used in place of clips 64. The left hand ends of clips 72, 74 for example snap onto a rod such as rod 52a in FIGS. 10a and 10b and the right hand ends of clips 72, 74 snap over rods 52b and 44d or 46d to releasably secure the roof and side walls in the upright position.

While only preferred embodiments of the invention have been described in detail, the invention is not limited thereby and modifications can be made within the scope of the attached claims.

We claim:

1. A collapsible cage structure comprising a rectangular base, a pair of side walls, a pair of end walls and a roof wherein at least the side walls, end walls and roof comprise rectangular metal grids, wherein the end walls are hinged along bottom edges thereof to respective end edges of the base for folding down onto the base and for unfolding from the base into an elevated upright position, the side walls each comprising upper and lower metal grids interconnected by a hinge joint, the lower metal grids being hinged along bottom edges thereof to respective side edges of the base, the upper metal grids being hinged along top edges thereof to respective side edges of the roof, the side walls being foldable inwardly concertina-wise about said hinge joints to collapse the side walls and roof onto the base over the end walls and being unfoldable about said hinge joints to elevate the side walls and roof prior to elevating the end walls, latching means for releasably securing the walls and roof in the elevated position means providing an animal access opening in one of the walls and stop means associated with each of said hinge joints for preventing each of the side walls from unfolding outwardly beyond a substantially planar configuration of the side wall.

2. A structure as claimed in claim 1 wherein the base comprises a dished metal grid open at one end and the structure includes a tray slidable into and out of the base through said one end.

3. A structure as claimed in claim 2 wherein the base includes a hinged locking arm for releasably engaging over said one end to prevent removal of the tray from within the base.

4. A structure as claimed in claim 2 wherein the base includes a further metal grid connected to top edges of the dished metal grid to form a floor of the cage structure.

5. A structure as claimed in claim 1 including hinge connections between adjacent metal grids of the structure which comprise rod ends of one grid curled around an end rod of an adjacent grid.

6. A structure as claimed in claim 1 including hinge connections between adjacent metal grids of the structure which comprise sleeves embracing a pair of end rods of the respective grids.

7. A structure as claimed in claim 1 wherein said means providing an animal access opening comprises a door in one of the end walls.

8. A structure as claimed in claim 7 which includes a latch mechanism for the door and mounting means for the door on said one of the end walls said mounting means for providing upward sliding and pivoting of the door on release of said latch mechanism into an open position wherein the door lies flat on top of the roof.

9. A structure as claimed in claim 1 wherein the latching means includes hooks at opposite ends of the roof for releasably snapping under top rods of the respective end walls in the elevated position of the end walls.

10. A structure as claimed in claim 1 wherein the latching means includes clip means pivotally mounted on a rod of one metal grid for releasably engaging with an adjacent metal grid in the elevated position of the walls and roof.

11. A structure as claimed in claim 10 wherein said clip means includes a clip pivotally mounted on a rod other than an end rod of said one metal grid for swinging over the end rod and a juxtaposed end rod of the adjacent metal grid to releasably grip the end rods together.

12. A structure as claimed in claim 11 wherein said clip comprises a sheet metal clip adapted to be manually distorted by squeezing into a position releasably gripping said end rods together.

13. A structure as claimed in claim 11 wherein said clip comprises a plastic clip having a formation for snapping into engagement with said end rods for releasably gripping the end rods together.

14. A structure as claimed in claim 1 wherein said stop means comprises, for each of said hinge joints, a section of one of the upper and lower metal grids extending beyond the respect hinge joint.

15. A structure as claimed in claim 1 wherein the base and end walls are respectively configured for folding of the end walls onto the base one end wall over the other.

16. A collapsible cage structure comprising a rectangular base, a pair of side walls, a pair of end walls and a roof wherein at least the side walls, end walls and roof comprise rectangular metal grids, wherein the end walls are hinged along bottom edges thereof to respective end edges of the base for folding down onto the base and for unfolding from the base into an elevated upright position, the side walls each comprising upper and lower metal grids interconnected by a hinge joint, the lower metal grids being hinged along bottom edges thereof to respective side edges of the base, the upper metal grids being hinged along top edges thereof to respective side edges of the roof, the side walls being foldable inwardly concertina-wise about said hinge joints to collapse the side walls and roof onto the base over the end walls and being unfoldable about said hinge joints to elevate the side walls and roof prior to elevating the end walls, latching means for releasably securing the walls and roof in the elevated position means providing an animal access opening in one of the walls and stop means associated with each of said hinge joints for preventing each of the side walls from unfolding outwardly beyond a substantially planar configuration of the side wall wherein the latching means comprises pivotal clips on respective ones of the grids for releasably latching with adjacent grids in the elevated positions of the walls and roof.

17. A structure as claimed in claim 16 wherein the clips comprise sheet metal clips adapted to be manually distorted by squeezing into positions releasably latching with the adjacent grids.

18. A structure as claimed in claim 16 including stop means associated with each of said hinge joints for preventing each of the side walls from unfolding outwardly beyond a substantially planar configuration of the side wall.

19. A structure as claimed in claim 16 wherein the clips include a clip pivotally mounted on a rod other than an end rod on one metal grid for swinging over the end rod and a juxtaposed end rod of an adjacent metal grid to releasably grip the end rods together.

20. A structure as claimed in claim 19 wherein the clip comprises a sheet metal clip adapted to be manually distorted by squeezing into a position releasably gripping said end rods together.

21. A structure as claimed in claim 19 wherein the clip comprises a plastic clip having a formation for snapping into engagement with said end rods for releasably gripping the end rods together.

* * * * *